UNITED STATES PATENT OFFICE.

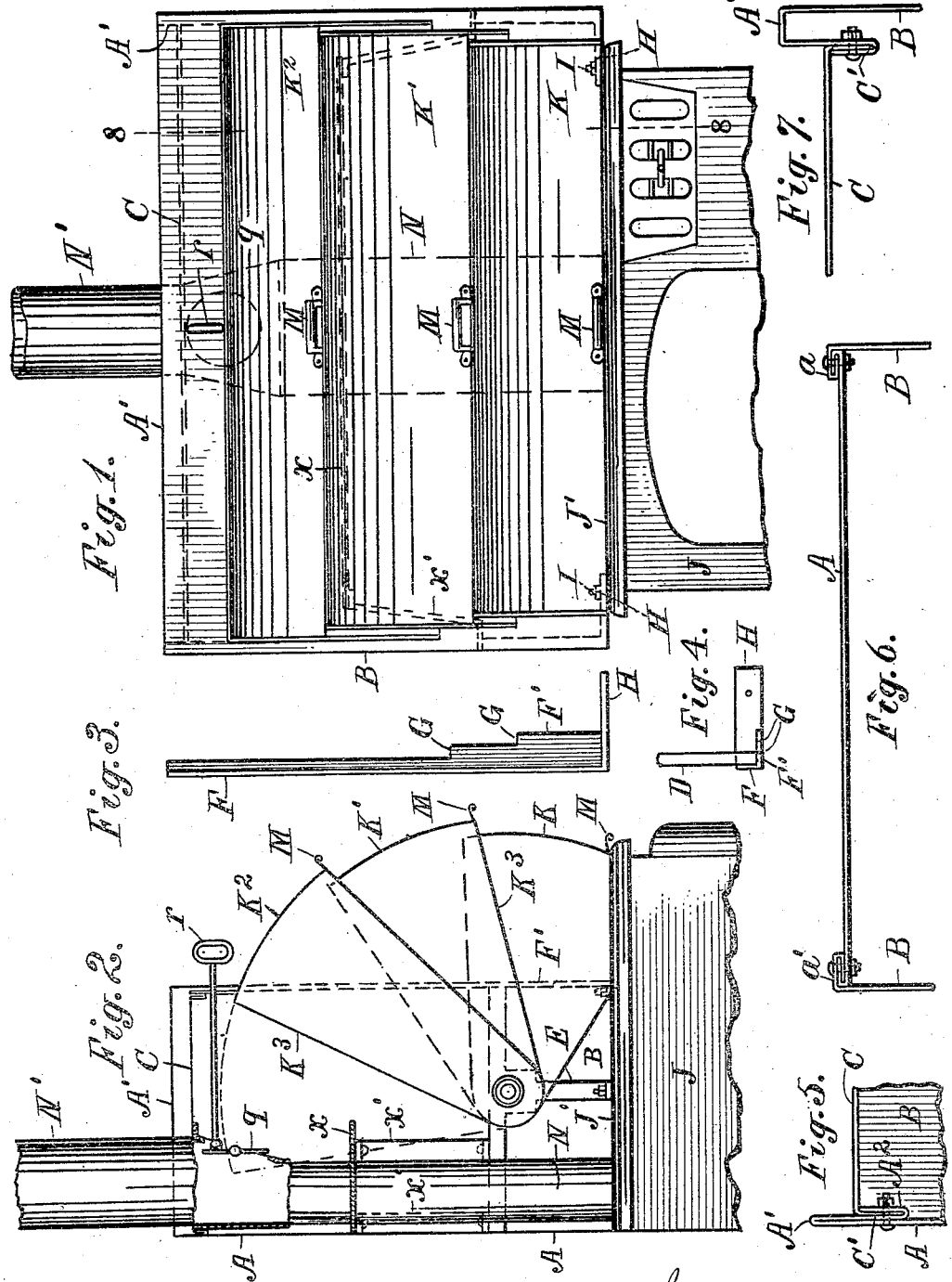

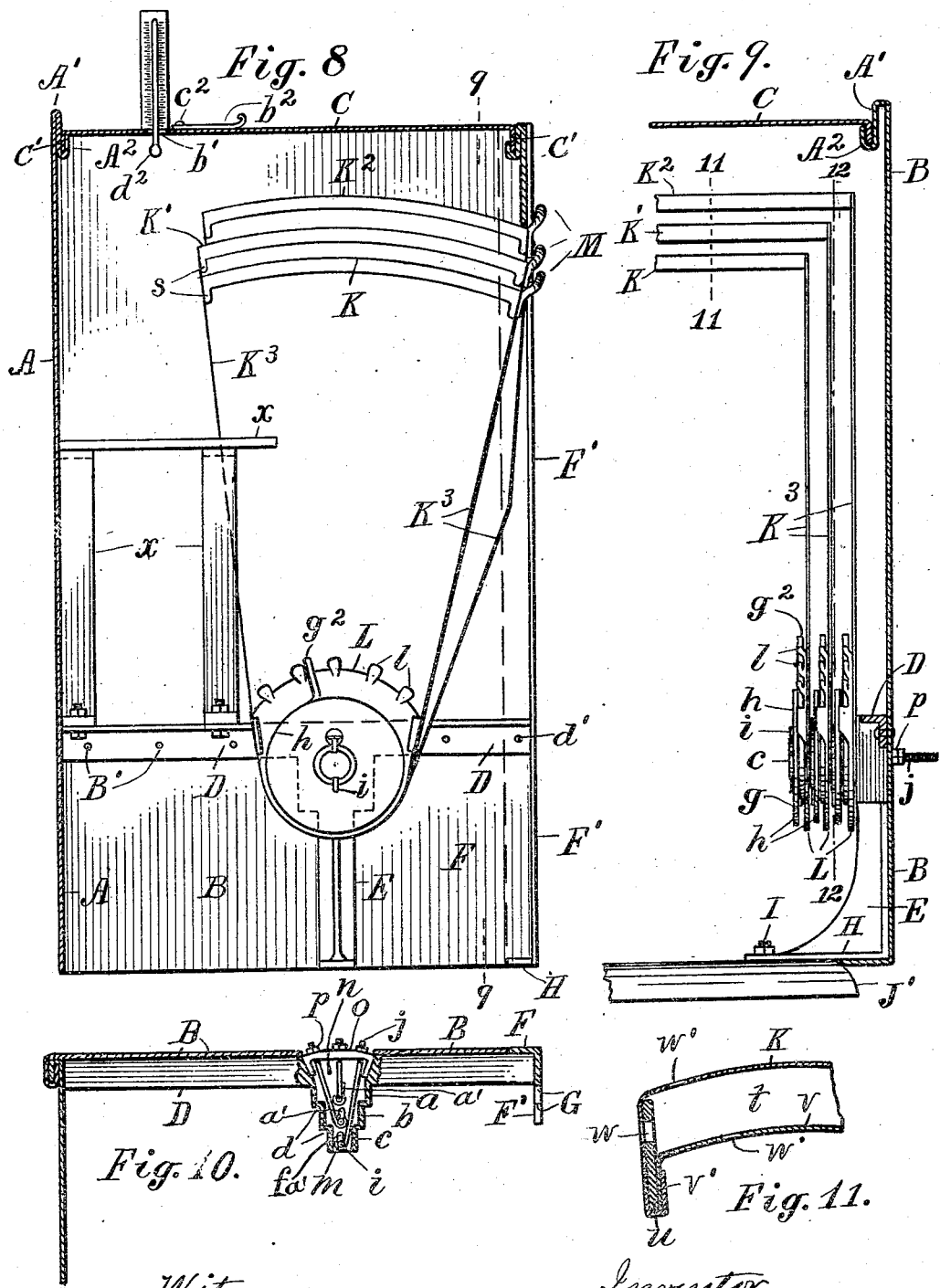

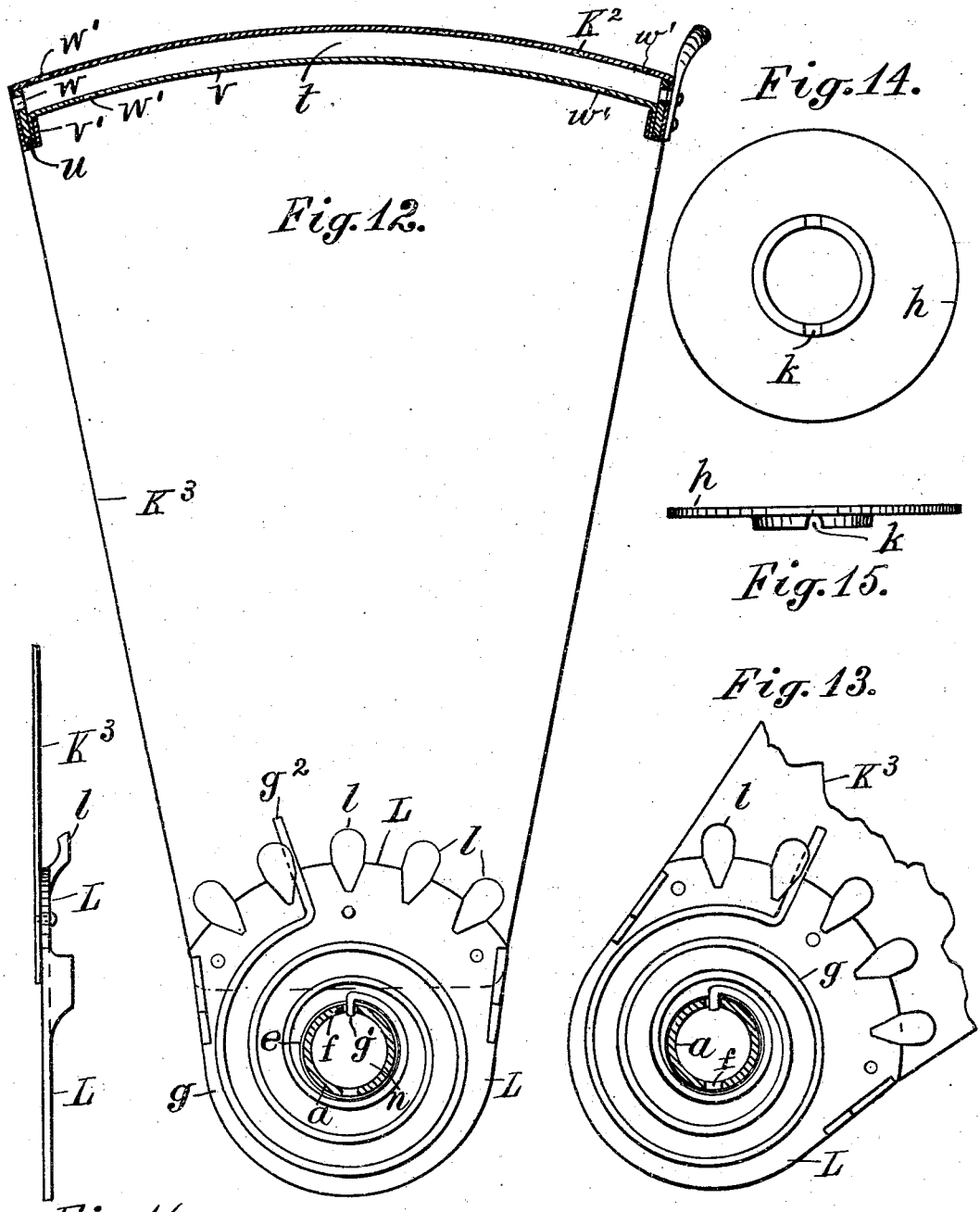

BENJAMIN F. CARPENTER, OF ROSELLE PARK, NEW JERSEY.

COOKING-CABINET AND HEAT-CONSERVATOR.

938,121.  Specification of Letters Patent. Patented Oct. 26, 1909.

Application filed October 9, 1908. Serial No. 456,997.

*To all whom it may concern:*

Be it known that I, BENJAMIN F. CARPENTER, a citizen of the United States, of 625 Chestnut street, Roselle Park, county of Union, and State of New Jersey, have invented certain new and useful Improvements in Cooking-Cabinets and Heat-Conservators, fully described and represented in the following specification and the accompanying drawings, forming a part of the same.

This invention relates to an attachment for cooking stoves and ranges, and consists of a casing set upon the stove, with segmental guards hinged thereon and adapted to turn downward when in use to wholly inclose the top of the range. These parts form a cooking cabinet, which I also term a heat conservator, as it greatly economizes the use of fuel.

The invention performs the following functions: First, it shields the cook from the emanations diffused by the operation of cooking, among which are radiated heat, spattering fluids such as gravies, pot liquor, batter, &c., sudden bursts of flame, gases, hot coals, ashes or other injurious, disagreeable or offensive emanations. Second, it secures economy of fuel by utilizing the heat for the purpose of cooking or other household operations, such as laundry work, &c. Third, it maintains sanitary conditions in the kitchen and adjacent rooms by preventing excessive heat in hot weather, and the diffusion of smoke, greasy particles, dust, steam and vapors which soil and tarnish, and offensive odors which, when not confined, pervade to some extent the entire house in which the cooking is done. Fourth, it furnishes a capacious warming chamber including the whole area upon the top of the stove; in which one or more compartments can be provided, and the heat in such compartments variously regulated so that all food in pots or dishes can be preserved in a regulated atmosphere at any degree of heat desired. Fifth, it furnishes abundant shelf space for food, dishes and miscellaneous cooking and stove appliances. Sixth, it carries off the gases arising from "banked" fires, so as to secure (without injury to the health by the diffusion of poisonous gases) the greatest economy in fuel-combustion during the night or other periods in which active fires are not required. Seventh, it enables the housekeeper to control and regulate the heat according to the temperatures of various seasons, thus reducing the heat of the kitchen fully twenty degrees in summer, and thus rendering it comfortable; and confining the heat to the stove or range in winter, so as to utilize it most economically in heating and cooking operations.

The invention thus furnishes the means whereby scientific sanitary operations of cooking can be effected in a comfortable and healthful atmosphere, and cooks educated in domestic economy, especially in the economical use of fuel, and in the control of heat in such a manner as to produce the best results.

The invention will be understood by reference to the annexed drawing, in which—

Figure 1 is a front elevation of the top of a stove with the cabinet thereon and the front of the casing closed; Fig. 2 is an end view of the same parts with the nearer end of the casing removed; Fig. 3 is an inside elevation of one of the corner posts of the casing; Fig. 4 is a plan of such post with the front end of the pivot-frame; Fig. 5 is an elevation showing the detachable joint between the back and the top of the casing; Fig. 6 is a plan showing the detachable joint between the back and the ends of the casing; Fig. 7 is an elevation showing the detachable joint between the top and the ends of the casing; Fig. 8 is a vertical section of the cabinet on line 8—8 in Fig. 1 with the segmental doors turned up inside the top of the casing; Fig. 9 is a front elevation of the same parts with the casing in section on line 9—9 in Fig. 8; Fig. 10 is a plan of one end of the casing and its reinforcing cast metal frame, with the pivot shown in section thereon and the means for operating the brakes; Fig. 11 is a cross section at one edge of one of the door segments, taken on line 11—11 in Fig. 9; Fig. 12 is a section of one of the segmental doors on line 12—12 in Fig. 9; drawn upon a larger scale than Fig. 9, with the friction disk removed and the door turned upwardly as when inside the casing; Fig. 13 shows the inner end of the arm upon such door turned and the spring contracted thereby; Fig. 14 is a front view and Fig. 15 a plan of the friction disk; and Fig. 16 is an edge view of the arm-hub with part of the arm thereon.

To facilitate the transportation of the cabinet, the casing is made with detachable folded seams, the back A having hook flanges at the ends to engage folds $a'$ upon the rear corners of the end-pieces B. The back A of the casing is provided at the top with a downwardly bent flange $A'$ having a lip $A^2$ bent upward at its lower end to receive a hook $C'$ at the rear edge of the top-piece C, as shown in Figs. 5 and 8. The ends and front of the top-piece C are furnished with similar hooks $C'$, as shown in Figs. 7 and 8, and the end-pieces B, as shown in Figs. 7 and 9, are also formed with reflexed flanges $A'$ and lip $A^2$ to engage the hooks $C'$, but the top of the flange $A'$ projects above the top C at the back and ends, to prevent articles placed thereon from slipping off.

Inside each of the ends B, a cast-metal frame is secured by rivets $B'$, being formed with a horizontal bar D and an upright leg E, and a pivot at the junction of the bar and leg formed, as shown in Fig. 10, with hollow graded journals $a$, $b$, $c$, upon which the arms of the segmental doors are jointed.

The front corners of the casing are provided with posts F riveted to the bar D at $d'$ and having a front flange $F'$ with progressively projecting steps or shoulders G thereon to limit the downward movement of the doors. The leg E and post F are provided with feet H to rest upon the top of the stove to be secured thereon by a bolt I, as shown in Figs. 1, 2 and 9.

To wholly expose the top $J'$ of the stove J (partly shown in Figs. 1 and 2) the casing is preferably made so that the inner edges of the posts set over the ends of the top, as shown in Fig. 1; the feet H projecting inwardly to rest upon the stove top, as shown in that figure.

The sheet-metal ends B of the casing are extended under the feet to contact with the stove top, as shown in Fig. 9, and form a bottom joint between the stove-top and the casing.

The door-segments K, $K'$, $K^2$, are shown three in number, of progressively increasing length and provided each upon its forward corner with a handle M to move the segment, and formed with arms $K^3$ which are secured to the hubs L, shown in Figs. 12 and 16, and such hubs jointed upon the journals $a$, $b$ and $c$. These journals are graded or progressively reduced in size to form a succession of shoulders $d$, as shown in Fig. 10, against which the hubs may be pressed to produce a frictional resistance to the movement of the doors. The hubs of the several arms have holes $e$ which are graded or progressively reduced to fit and turn loosely upon the graded journals. The hub of each arm covers only a portion of the space upon its journal and is set in contact with the shoulder $d$ to form a brake when pressed against such shoulder.

The journals are made hollow and each formed with a slot $f$ in which the inner end $g'$ of a spiral wire spring $g$ is locked, the outer end $g^2$ of the spring being bent outwardly to engage one of several lugs $l$ upon the hub L; these furnishing a means of varying the effect of the spring upon the door segment to which the hub is attached.

The journal is stationary and the spring is so adjusted that when each door is in its upright position, as shown in Figs. 8 and 12, the tension on the spring is diminished, and as the doors are turned downwardly to close the casing and cover the front of the stove top the tension of the spring is increased and operates to counterbalance the weight of the door, which is effective in such position. In addition to such counterbalancing, a frictional resistance is opposed to the movement of the door to prevent its accidental displacement when set in any desired position. Such resistance is produced by a friction disk $h$ fitted upon the journal adjacent to the spring $g$ and pressed toward the spring and the hub L by a cross-pin $i$ and a tightening bolt $j$.

The disk $h$ has a hub formed with notches $k$ coinciding with the slots $f$ in the journals and the cross-pin $i$ fits in such notches and extends across the journal, where it is engaged by a hook $m$ upon the inner end of the bolt $j$.

The hollow chamber $n$ within the journals is extended to the outer side of the frame D—E, and a bearing-block $o$ is fitted to the outer end of such chamber to support the nuts $p$ upon the ends of the three bolts $j$ which are required to operate three disks for the three door-arms.

The tightening of one of the nuts $p$ presses the disk with which it is connected toward the spring, which in turn presses the hub L of the door-arm toward the shoulder $d$ upon its journal, thus producing a frictional resistance which may be graduated in any degree to hold the door when placed in any adjusted position by hand.

The relation of the progressively projecting shoulders G to the arms of the door segments, which are of progressively increasing length, as shown in Fig. 1, causes the door segment K to clear all of the shoulders and thus to descend until it touches the top of the stove, while the arms of the door segment $K'$ clear the upper shoulders but are arrested by the lower ones, and the arms of the door segment $K^2$ are arrested by the upper shoulders, and the three segments are thus automatically disposed to form a continuous inclosure for the front of the casing, while permitting any of the segmental doors to be raised independently of the others, sufficiently to expose the space behind such doors.

The lower door-segment K may be turned downward in contact with the stove top without turning downward the two upper door-segments, thus exposing the interior of the casing for the operations of the cook, while protecting the cook from the spattering of anything set upon the stove top.

When desired, the two upper door-segments may be turned into their operative position shown in Fig. 2, and the lower segment K turned upward inside the same, to permit the placing of any utensil upon the stove top or removal of one therefrom, or stirring its contents without exposing the cook to the entire radiation of heat, and at the same time confining the gases and vapors to the interior of the doors and casing, as they rise inside the upper segments.

The stovepipe N is shown in Fig. 2 extended upward from the top J' of the stove, through the rear part of the casing and through the top C. The back A thus lies behind the stove-pipe to inclose the same.

The pipe connected with the stove top is commonly made of oval form, and is therefore shown of greater width than thickness in Figs. 1 and 2, with a round pipe N' extended therefrom above the top C of the casing.

Below the top of the casing, a damper $q$ is shown inserted in the wall of the stovepipe or in a casting fitted thereto, and a pull-rod $r$ extended therefrom to the front of the casing by which the damper may be opened at any time to produce an upward draft within the casing, which draws all the vapors and gases into the stovepipe N'.

The door-segments are made of graded radii so as to nest one within the other, the succession of journals ($a$, $b$ and $c$), upon the pivots for the arms $K^3$, permitting the arms to play within one another the same as the segments, as clearly shown in Fig. 9.

The stops G upon the flanges F' of the corner posts permit the forward movement of the several doors in different degrees so that they stand one above the other when lowered to wholly inclose the front of the stove-top and casing, but they do not prevent the lifting of any of the door-segments independently. The stops project outward progressively from the top to the bottom of the posts, and bring the successive portions of the posts adjacent to the arms $K^3$ of the several doors, and thus partially close the space between the ends of the doors and the ends B of the casing. To close the space between the several segments K, K', $K^2$, the outer segments are formed at their front and rear edges, as shown in Fig. 8, with inwardly projecting flanges $s$ which clear the outsides of the inner door-segments, but substantially close the opening between the segments in both the open and closed positions of the segments.

The door-segments are preferably made with double walls, as shown in Fig. 12, to form an air-space $t$ which prevents the radiation of heat when the casing is closed.

The flanges $s$ shown in Fig. 8 are in such case formed as shown in Fig. 12, and the front and rear edges of the segments at the same time strengthened, by folding the sheet metal of the segment K' or $K^2$ around a strip of hoop iron $u$ and locking the edges of the inner wall $v$ within a flange $v'$ bent around the inner side of such strip.

To cool the air-space in the door-segments and further prevent the radiation of heat, holes $w$ are formed through the edges of the segment and holes $w'$ through the walls of the air-space; these holes permitting cold air to pass through and into the segment and thence to the chimney with the vapors in the cabinet.

Ventilation for the wire springs $g$ is also provided through the hollow interior of the hollow journals $a$, $b$, $c$, which are formed upon the upper and lower sides with slots $f$ (shown in Figs. 10 and 12) to permit the cross-pins $i$ to move longitudinally of the journal as the bolts $j$ are tightened.

In Fig. 10, the end B of the casing is shown at the right and left hand sides of the hollow chamber $n$ which extends from the journals to the outer side of the frame and thence outwardly through the end plate B. The cold air entering the hollow journals from outside the casing passes through the slots $a'$ into direct contact with the coils of the wire springs $g$ and thus prevents the heat from impairing the temper of the springs.

A shelf $x$ is shown in Figs. 1 and 2 supported by legs $x'$ upon the bars D within the ends of the casing, the shelf being made shorter than the shortest door-segment so that the segment arms may pass its ends when turned upwardly, as shown in Figs. 2 and 8. The shelf is shown perforated for the passage of the stovepipe N.

In Fig. 8 a hole $b'$ is shown in the top $c$ over the shelf $x$, with the bulb $d^2$ of a thermometer inserted through the hole to indicate the temperature of the casing. A cover $b^2$ is shown pivoted upon the top by a rivet $c^2$ to close the hole when the thermometer is not in use. By the use of the thermometer and the adjusting of the damper, the temperature within the casing may be regulated as desired. It is to be understood that any of the segments can be placed in an operative position independently of the others, because they are fitted, as shown in Figs. 8 and 9, to turn one within the other, and the upper segment $K^2$ or the upper two segments can be lowered whenever desired, while the segment K is resting upon the stove top, so as to move articles to or from the shelf $x$, or to perform any needed operation within the casing while protected by the lower segment. As the post F is secured to the bar D, its foot serves as a foot for the casing as well as the foot on the upright leg E, the two feet at each end of the casing thus holding it securely in place upon the stove top.

Having thus set forth the nature of the invention what is claimed herein is:

1. The combination, with a stove or range, of a cooking cabinet having a casing with a back A, top C and opposite ends B, and open at the front and bottom, a pivot inside each of the casing-ends, and a series of segmental doors journaled upon such pivots and adapted when turned forwardly to inclose the front of the stove-top and casing, the said doors being movable independently for exposing the upper or lower part of the inclosed space separately at pleasure.

2. A cooking cabinet consisting of a sheet-metal casing having opposite ends B and open at the front and bottom, each end having the front corner provided with a post F having a front flange F′ with progressively projecting shoulders G, a pivot inside each of the casing ends having a series of progressively reduced journals, and a series of segmental doors of progressively increasing length having arms jointed upon the said journals and operating, when moved, to contact successively with the shoulders G to form a continuous inclosure for the front of the casing, while permitting any of the segmental doors to be raised independently of the others.

3. The combination, with a stove or range, of a cooking cabinet having a casing with opposite ends B and open at the front and bottom, a pivot inside each of the casing-ends, a series of segmental doors having arms with hubs L journaled upon such pivots and adapted when turned forwardly to inclose the front of the stove-top and casing, and separate means for balancing the weight of such doors independently, whereby they may be adjusted separately into the required positions.

4. The combination, with a stove or range, of a cooking cabinet having a casing with opposite ends B and open at the front and bottom, a series of segmental doors having arms with hubs L journaled upon such pivots and adapted when turned forwardly to inclose the front of the stove-top and casing, and a brake applied to the arm of each segmental door to hold it in its adjusted position.

5. The combination, with a stove or range, of a cooking cabinet having a casing with a back A, top C and opposite ends B and open at the front and bottom, a pivot inside each of the casing-ends, a series of segmental doors journaled upon such pivots, having double walled door-segments to prevent radiation of heat when turned over the stove-top, and a projection upon the inside of each of the outer door-segments to close the space between the same and the inner door-segments, when in both open and closed positions.

6. The combination, with a stove or range, of a cooking cabinet having a casing with a back A, top C and opposite ends B and open at the front and bottom, a pivot inside each of the casing-ends, a series of segmental doors journaled upon such pivots and having double walled door-segments to prevent radiation of heat when turned over the stove-top, each door being provided separately with means for counterbalancing the weight of the door and with a brake to hold such door in any adjusted position.

7. The combination, with a stove or range, of a cooking cabinet having a casing with a back A, top C and opposite ends B and open at the front and bottom, a pivot inside each of the casing-ends, a series of segmental doors journaled upon such pivots and having double walled door-segments to prevent radiation of heat when turned over the stove-top, each door being provided separately with means for counterbalancing the weight of the door, a brake to hold such door in any adjusted position, and a handle projecting from the outer side of each door-segment at its lower edge for moving such door-segment independently of the other door-segments.

8. The combination, with a stove or range, of a cooking cabinet having a sheet-metal casing formed with a back A, top C and opposite ends B and open at the front and bottom, and the front corners of the ends provided with posts F having shoulders G thereon to form stops, a pivot inside each of the casing-ends, a series of segmental doors journaled upon such pivots, a handle upon each door for moving the same independently, separate brakes for retaining the doors independently in their adjusted positions, and the stops upon the posts F being arranged to set the series of doors in a suitable position for wholly inclosing the front of the stove-top and casing when required.

9. The combination, with a stove or range having a stovepipe projected upwardly from its rear part, of a cooking cabinet having a sheet-metal casing formed with opposite ends, a top having the stovepipe extended upwardly therethrough and a back extended from the top downwardly to the stove or range behind the stovepipe, a pivot inside each of the casing-ends, a series of segmental doors journaled upon the said pivots to inclose the front of the stove-top and casing, the upper part of the stove-top having an opening within the casing, and a damper in such opening with handle projected forwardly outside of the casing, for opening the damper to vent the casing when desired.

10. The combination, with a stove or range having a stovepipe projected upwardly from its rear part, of a cooking cabinet having a sheet-metal casing formed with opposite ends, a top having the stovepipe extended upwardly therethrough and a back extended from the top downwardly to the stove or range behind the stovepipe, a pivot inside each of the casing-ends, a series of segmental doors journaled upon the said pivots to inclose the front of the stove-top and casing, the upper part of the stovepipe having an opening within the casing and a damper in such opening with handle projected forwardly outside of the casing, for opening the damper to vent the casing when desired, and the casing having a hole $b'$ in the top for inserting a thermometer bulb, and a cover $b^2$ pivoted upon the top to close such hole, the use of the damper and thermometer permitting the regulation of the temperature within the casing to any desired degree.

11. A cooking cabinet, consisting of a sheet-metal casing having top, opposite ends and back and open at the front and bottom, a cast-metal frame secured within each end of the casing and provided with a pivot having a series of progressively reduced journals with a shoulder at the outer end of each journal, a series of segmental doors having arms jointed upon the said journals, and means for pressing the several arms independently toward the said shoulders to form brakes for retaining the segmental doors in their adjusted positions.

12. A cooking cabinet, consisting of a sheet-metal casing having opposite ends and open at the front and bottom, a cast-metal frame secured within each end of the casing and provided with a hollow pivot having a series of progressively reduced journals with a shoulder at the outer end of each journal, a series of segmental doors having arms jointed upon the said journals contiguous to the said shoulders, coiled springs having their inner ends locked to the said journals and their outer ends applied to the said arms, means for varying the connection of such springs with the arms, brake-disks fitted to the journals at the inner sides of the springs, and connections extending from each brake-disk to the exterior of the casing, for adjusting the pressures of the several disks independently upon their respective arms.

13. A cooking cabinet, consisting of a sheet-metal casing having opposite ends and open at the front and bottom, a cast-metal frame secured within each end of the casing and provided with a hollow pivot having a series of progressively reduced journals with a shoulder at the outer end of each journal, a series of segmental doors having arms jointed upon the said journals contiguous to the shoulders, coiled springs having their inner ends locked to the said journals and their outer ends applied to the said arms to counterbalance the segmental doors separately, the hollow pivots having each the chamber $n$ extended to the outer side of the frame to receive the cooler air, and each of the hollow journals having perforations $a'$ extending from their interior toward the coils of the spring thereon, to admit the outer air thereto and prevent excessive heating of the spring.

14. A cooking cabinet, consisting of a sheet-metal casing having opposite ends B and open at the front and bottom, each end having the cast-metal frame secured therein formed with horizontal bar D, upright leg E, and pivot at the junction of the bar and leg, and the front corners of the ends B provided with posts F having a front flange F' with shoulders G, and the legs and posts being provided with the feet H to rest upon the stove-top, a series of segmental doors formed with the double walled door-segments and the arms $K^3$ with hubs L secured thereto and jointed upon the pivots, and brakes applied to the hubs L separately for retaining the segmental doors in their adjusted positions.

In testimony whereof I have hereunto set my hand in the presence of two subscribing witnesses.

BENJAMIN F. CARPENTER.

Witnesses:
L. LEE,
THOMAS S. CRANE.